2,973,322
LUMINESCENT MATERIALS

Robert Stirling Wells and James Thomson Anderson, Rugby, England, assignors to The British Thomson-Houston Company Limited, London, England, a British company No Drawing. Filed Oct. 11, 1956, Ser. No. 615,247
Claims priority, application Great Britain Nov. 17, 1955
4 Claims. (Cl. 252—301.6)

This invention relates to luminescent materials, or phosphors. Such materials are capable when subjected to incident radiation of one wavelength of emitting radiation of another wavelength or wavelengths.

Zinc ortho-silicate activated with manganese is one of the earliest known phosphors. It emits a green luminescence when excited by short ultra violet radiation and cathode rays. Naturally occurring zinc silicate, or willemite, is also excited by long ultra violet radiation.

No useful phosphors based on strontium silicate alone have been prepared, so far as we are aware, but strontium silicate has been used in conjunction with other silicates, e.g. calcium, and lithium and barium, with manganese as activator in the preparation of efficient phosphors.

We have found that strontium silicate will enter into solid solution with zinc ortho-silicate and that the resulting solid solution has a much lower melting point than that of the zinc silicate. By incorporating strontium silicate in the zinc-ortho-silicate matrix we have been able to produce phosphors equal to or greater in efficiency than that of the plain zinc ortho-silicate activated with Mn. Furthermore owing to the lower melting point of the zinc-strontium silicate we have been able to prepare these phosphors in a completely reacted state by heating to a temperature of only 1100° C.

The present invention accordingly consists in a luminescent zinc-strontium silicate activated with manganese the molecular proportion of strontium oxide to zinc oxide in the silicate being not less than 5% and not more than 50%.

Up to 50% on a molecular basis of the ZnO in $Zn_2SiO_4$ may be replaced by SrO. At this degree of replacement a diminution in phosphor efficiency occurs, but with 25% replacement, actual improvement in efficiency takes place. Below 5% replacement of ZnO by SrO the effect becomes negligible.

In preparing the zinc-strontium silicate phosphor, we prefer to use $MnCl_2.4H_2O$ as the source of Mn, and for best results the quantity should lie between 0.0125 and 0.05 mol of $MnCl_2$ per total mols of ZnO+SrO. But larger or smaller proportions may be used.

It is believed that the strontium compound that enters into solid solution with the $Zn_2SiO_4$ is strontium meta-silicate $SrSiO_3$, and for that reason using a highly reactive silica suitable for phosphor preparation, we prefer to use 0.6 mol $SiO_2$ per mol ZnO, and 1.1 mols $SiO_2$ per mol SrO. Thus the material with 50% replacement of ZnO becomes 1 ZnO:1 SrO:1.7 $SiO_2$:0.025 to 0.1 $MnCl_2$.

We do not wish to limit the $SiO_2$ proportions of the $SiO_2$ to the exact figures quoted, since the phosphor will tolerate excess $SiO_2$ over the amount stated, and can be prepared with less $SiO_2$.

As an example of an embodiment of the invention, we will describe the preparation of a phosphor containing 1.5 mol ZnO:0.5 SrO:1.45 mol $SiO_2$:0.05 mol $MnCl_2$.

Mix intimately in the dry way:

12.3 gms. ZnO (containing 0.8% moisture)
7.38 gms. $SrCO_3$
9.5 gms. $SiO_2$ (containing 7.1% moisture)
2.0 mls. $MnCl_2$ solution (containing 0.5 g. $MnCl_2.4H_2O$/ml.)

The ZnO, $SrCO_3$, and the $MnCl_2$ should be a suitable purity for use in making luminescent materials; "Analar" quality is satisfactory.

The $SiO_2$ should also be suitably pure and reactive and allowance should be made for its moisture content.

Fire the mixture in a covered fused silica crucible in an atmosphere of air for 1 hour at 1100° C. Grind and mix the cooled mass and refire at 1100° C. for 2 hours as before. A third firing at 1100° C. for 2 hours may be necessary to attain full brilliance. Grind and sieve. The phosphor is ready for use.

The maximum firing temperature that can usefully be used is limited by the readiness with which the particular mixture being fired sinters. Excessive sintering should be avoided. Use of temperatures much below the sintering temperature make the time taken by the reaction unduly long. For the range of 5% to 50% SrO content of the total ZnO+SrO mols the firing temperature can usefully be between 1250° C. or so for the very low SrO content, to 1070° C. or so for the very high SrO content.

What we claim is:

1. A luminescent material consisting of a zinc silicate having between 5% and 50%, inclusive, in molecular proportion of the zinc oxide replaced by strontium oxide and having manganese as an activator.

2. A luminescent material consisting of a zinc silicate having between 5% and 50%, inclusive, in molecular proportion of the zinc oxide replaced by strontium oxide, said material containing 0.6 mol silica for every mol zinc oxide, and 1.1 mols silica for each mol of strontium oxide, said manganese being in an amount which lies between 0.0125 and 0.05 atom manganese for each molecule of oxide of zinc and strontium.

3. A luminescent material consisting of a zinc silicate having between 5% and 50%, inclusive, in molecular proportion of the zinc oxide replaced by strontium oxide, and having manganese derived from manganese chloride as an activator, the atomic proportion of manganese present in said material lying between 0.0125 and 0.05 for each molecule of zinc and strontium oxides.

4. The method of preparing a luminescent material which consists in intimately mixing together zinc oxide, silica, strontium carbonate and manganese chloride, the molecular proportion of strontium oxide to the zinc oxide present in said carbonate being between 5% and 50%, the molecular content of silica lying between 0.5 and 3.0 for each molecule of zinc and strontium and the molecular content of manganese chloride lying between 0.0125 and 0.05 for each molecule of zinc oxide and strontium carbonate, heating said mixture to a temperature of between 1070° and 1250° C. in an oxidising atmosphere, and then reducing the resulting compound to powder.

References Cited in the file of this patent

UNITED STATES PATENTS

| | | |
|---|---|---|
| 2,210,087 | Leverenz | Aug. 6, 1940 |
| 2,226,404 | Jenkins | Dec. 24, 1940 |
| 2,540,804 | Anderson | Feb. 6, 1951 |
| 2,601,032 | Larach | June 17, 1952 |
| 2,628,944 | Nagy | Feb. 17, 1953 |

FOREIGN PATENTS

| | | |
|---|---|---|
| 719,230 | Germany | Apr. 1, 1942 |
| 883,787 | Germany | July 20, 1953 |

OTHER REFERENCES

Smith: "Complex Silicate Phosphors," Jour. of Elect. Chem. Soc. (November 1949), pages 287–296.